United States Patent Office 3,268,460
Patented August 23, 1966

3,268,460
ADHESIVE AND METHOD OF MAKING THE SAME
John F. Miller and Jack R. McClary, Tacoma, Wash., assignors, by mesne assignments, to Hercules Powder Company, Wilmington, Del., a corporation of Delaware
No Drawing. Filed Dec. 28, 1961, Ser. No. 162,947
8 Claims. (Cl. 260—17.2)

This invention relates to a resin adhesive resulting from condensing phenol and aldehyde to make a resinous condensate and then further condensing said condensate with bark flour, and the method of making such a resin adhesive.

A principal object of the present invention is to provide a resin adhesive suitable for use in the manufacture of plywood of either exterior or interior grade, and which is more economical or more effective, or both, than adhesives previously used for this purpose.

In the manufacture of plywood a large portion of the cost is the expense of the adhesive used to bond together the plies of the plywood. For years, therefore, efforts have been made to reduce the cost of such adhesive by employing different types of adhesive substances, by varying the proportions of adhesive substances used, by additives to make the adhesive substances more effective as a binder and by utilizing fillers in connection with adhesive substances to increase the amount of surface area which could be covered by the adhesive and still obtain a satisfactory bond.

A technique which has been employed in the past is to prepare a phenolic resin by condensing phenol and aldehyde, the aldehyde being preferably formaldehyde, in the presence of alkali and after the condensation process has been completed to produce the resin the bulk of the adhesive has been expanded by mixing the resin with fillers of various types, such as bark flour, for example, such flour being derived from refining and comminuting Douglas fir bark. Also, for plywood-adhesive use proteinaceous or amylaceous materials, such as wheat flour, soy flour, blood albumin and water soluble dried whole blood have been mixed with phenolic resins.

In providing a more economical resin for use in the manufacture of plywood it is an object to avoid reducing the bond strength of the adhesive and even to enhance the bonding properties of the adhesive.

The objects of the invention stated above can be accomplished by use of an adhesive resulting from the reaction of a phenol-aldehyde resinous condensate and extender flour heated or cooked together, as distinguished from condensing the phenol and aldehyde components until the condensation process is completed to the point ready for application of the resin to the veneer and then mixing such resin at substantially room temperature with bark flour, so that the bark flour serves simply as a filler or bulking component.

In preparing the phenolic resin of the present invention phenol and aldehyde are provided in the proportion of phenol to aldehyde within the range of one mol of phenol to from 1.85 to 2.2 moles of aldehyde, all or most of which aldehyde is preferably formaldehyde in aqueous solution, although all or part of the aldehyde can be in the form of paraformaldehyde. The preferred proportion is one mole of phenol to 1.98 moles of aldehyde. It is advantageous to use in the phenol-aldehyde resin a small amount of mucilage, such as a one percent aqueous solution of natural plant gum, for example, Guar gum, locust beam gum or gum tragacanth. This mucilage must be dispersed homogeneously throughout the resin preparation. The following ranges of proportions by weight of the various ingredients can be used.

| | Percent |
|---|---|
| Phenol, U.S.P. | 30.00 to 39.00 |
| Formaldehyde (100% basis) | 20.2 to 26.3 |
| Alkali flake (100% basis) | 2.0 to 3.5 |
| Hydrocolloid material (gum) | .005 to .02 |
| Total water | 47.80 to 31.0 |
| Total solids | 40.0 to 60.0 |

A typical example of ingredients which may be used in the phenol-aldehyde resin preparation is as follows, the proportions being given by weight.

| | Percent |
|---|---|
| U.S.P. phenol | 36.28 |
| Formaldehyde (100% basis) | 22.96 |
| Sodium hydroxide flake (100% basis) | 2.92 |
| Hydrocolloid material (gum) | .015 |
| Water | 37.83 |

In the foregoing example formaldehyde is given on the basis of 100% formaldehyde, but since formaldehyde is not available commercially in this form the chemical equivalent can be obtained by using a combination of a 37% aqueous solution of formaldehyde with paraformaldehyde, or paraformaldehyde alone, or a 44% aqueous solution of formaldehyde alone, or any equivalent combination. Thus the proper amount of formaldehyde will be provided if 51.34% of the preparation is 37% formaldehyde solution and 4.35% of the preparation is paraformaldehyde assaying 91% formaldehyde, the separately added water being .73%; or 25.23% of paraformaldehyde used with 31.19% of water; or 52.18% of 44% formaldehyde solution used with 4.24% of water. These weight proportions of phenol and formaldehyde provide a ratio of 1 mole of phenol to 1.98 moles of formaldehyde. In each of these instances it is assumed that 5.83% of 50% sodium hydroxide solution is used instead of sodium hydroxide flake, and the hydrocolloid gum is added in the form of 1.47% of a mucilage solution containing 1% of gum.

In the process of preparing the adhesive according to the present invention the phenol and aldehyde are charged into a kettle with part of the alkali and these ingredients react exothermically. If increased reaction rate is desired, external heat may be applied. Such reaction may be allowed to rise as a result of the exothermic reaction of the ingredients to a temperature of 210° F. where the reaction continues under reflux until a Gardner-Holdt viscosity of "A" (50 centipoise) is obtained. The composition is then cooled to 190° F. and held at that temperature until a Gardner-Holdt viscosity of "G" (165 centipoise) is reached. The composition is then further cooled to 180° F. and held at that temperature until a Gardner-Holdt viscosity of "L" (300 centipoise) results. Thereupon the composition is cooled rapidly to 90° F., the remainder of the alkali is added and the cooling is continued until the composition reaches a temperature of 75° F. In the phenol and aldehyde condensation using the proportions of ingredients given in the specific example 64% of the total sodium hydroxide solution was included with the initial ingredients and the balance of 36% of the sodium hydroxide solution was added in the final period of cooling.

The phenol-aldehyde resin resulting from the above condensing procedure is in the form of liquid sufficiently thin that it can be pumped readily. It may therefore be transported to a plywood plant in suitable containers, or in bulk as in a tank truck or railway car from which the resin can be pumped into holding containers at the plant. The partially condensed phenol-aldehyde resin ready to be added to the bark flour preparation has a resin solids content of about 53.7% and a pH of about 9.85, the viscosity being 200 r.p.m. Stormer (463 centipoise).

Preparation of the extender for incorporation with the resin is performed at the mill separately from initial condensation of the phenol-aldehyde resin. Extender in the form of flour made from bark or similar material having an affinity for the phenol-aldehyde resin under condensing conditions is utilized, Douglas fir bark, redwood bark, hemlock bark and peanut shells being representative examples of the flour source. A more specific example is Silvacon 472, Douglas fir bark ground so that about 50% passes through a 200 mesh screen. In the flour extender preparation the following proportions of ingredients by weight can be used as an example.

| | Percent |
|---|---|
| Water | 61.5 |
| Alkali (dry weight) | 9.5 |
| Flour extender | 21.8 |
| Sodium carbonate | 7.2 |

The extender will normally be purchased by the mill in the form of flour and the alkali, such as sodium hydroxide or potassium hydroxide, can be purchased either in dry flake form or in aqueous solution.

Hot water, such as at a temperature of 180° F., and alkali are mixed to homogeneity and the flour extender is then stirred into the liquid and stirring is continued to insure homogeneity of the mixture while heating is continued at a temperature of at least 150° F. During this procedure some of the bark dissolves and most of the remainder of the bark goes into suspension. To this mixture is added the sodium carbonate as a buffering agent. Stirring is continued until such buffering agent is dissolved completely, the temperature still being maintained above 150° F. and preferably in the vicinity of 180° F.

After the extender mixture has been processed by the mill as described above, the next step is to add the partially condensed phenol-aldehyde resin composition described above which has been obtained by the mill from the resin supplier. On the basis of dry weight of flour extender, the amount of extender should not exceed 40% of the liquid resin by weight, and preferably is from 30% to 35% of the liquid resin. The proportion of liquid resin to extender preparation, according to the specific examples given, should be approximately one part by weight of phenol-aldehyde resin to 1½ parts of flour extender preparation, which is approximately one-third as much flour, dry weight, as liquid resin.

If the resin is at room temperature and is added to the flour extender preparation described above at a temperature of 180° F. the resulting temperature of the entire mixture will be approximately 150° F. The mixture may be processed at this temperature but preferably it is heated to the temperature range of 175° F. to 185° F. The minimum temperature at which the extender mixture is cooked prior to addition of the phenol-aldehyde resin is 150° F. and if the phenol-aldehyde resin at room temperature is added to the extender preparation at this temperature, the temperature of the mixture will be reduced to approximately 120° F., in which case it must be heated to at least 150° F. but preferably is heated to the range of 175° F. to 185° F., as stated above. Although the temperature range of 175° F. to 185° F. is preferred, this practice is not limited to this range and is practical within the range of 150° F. to 212° F.

The resin and extender mixture is maintained at the elevated temperature of at least 150° F. and preferably in the range of 175° F. to 185° F. for a period of ten to twenty minutes while the mixture is being stirred. The mixture of specific phenol-aldehyde resin and extender preparation given when heated for 12 minutes at a temperature of 180° F. and cooled to 95° F. during a period of 50 minutes produced a satisfactory adhesive. During this period further condensation of the mixture ingredients occurs and at this time the preparation is cooled to room temperature. The resulting adhesive will provide a satisfactory bond despite the fact that it contains a smaller quantity of resin solids than in most phenolic adhesives. The resin solids content may be only 20.0 percent, as compared to substantially higher resin solid proportions in most satisfactory phenolic resin adhesives including bark flour used as a filler.

The final viscosity of the adhesive will be affected by the duration of the heating period and the cooling period of the phenol-aldehyde resin and extender mixture. Change in the viscosity as may be desired can be accomplished by changing the cooling schedule of the phenol-aldehyde resin preparation process to increase or decrease its viscosity as added to the extender preparation, or by heating the composite phenol-aldehyde resin and extender preparation to a higher temperature, or by maintaining a high temperature for a longer period. Alternatively, the viscosity can be increased by cooling the final preparation over a longer period. The viscosity of the final adhesive can also be increased by reducing the amount of water used in preparation of the extender mixture.

The ingredients and procedure used in preparing adhesive resulting from the process described above suitable for use in the manufacture of plywood are subject to considerable variation, those described being typical and satisfactory. The amount of bark or peanut shell flour extender which can be used in the adhesive, calculated on the basis of dry weight of the extender, may vary from 10% by weight to 16% by weight of the final adhesive.

A suitable filler of proteinaceous or amylaceous type can be added to the completed phenol-aldehyde resin and flour extender condensation product, if desired, wheat flour, soy flour, blood albumin and water soluble dried whole blood having been mentioned above as examples. The quantity of such fillers used will depend upon the strength and waterproof characteristics of the bond desired, an amount up to 5 percent by weight of the final adhesive being satisfactory.

Adhesive of the present invention produced by the procedure described above can be spread on veneer in conventional quantities and set in a plywood press utilizing conventional press temperatures, pressures and curing times.

We claim as our invention:

1. The method of making adhesive which comprises heating and thereby partially condensing phenol and aldehyde in the proportion of 1.85 to 2.2 moles of aldehyde to one mole of phenol in the presence of alkali, mixing the partially condensed phenol and aldehyde with flour extender having an affinity for such partially condensed phenol-aldehyde resin selected from the group consisting of bark and peanut shells, and heating such extender and phenol-aldehyde resin to a temperature of at least 150° F. to effect further condensation.

2. The method of making adhesive which comprises heating and thereby partially condensing phenol and aldehyde in the proportion of 1.85 to 2.2 moles of aldehyde to one mole of phenol in the presence of alkali, mixing the partially condensed phenol-aldehyde resin with bark flour extender having an affinity for such partially condensed phenol-aldehyde resin, and heating such extender and phenol-aldehyde resin to a temperature of at least 150° F. to effect further condensation.

3. The method of making adhesive which comprises heating and thereby partially condensing phenol and aldehyde in the proportion of 1.85 to 2.2 moles of aldehyde to one mole of phenol in the presence of alkali, heating an aqueous mixture of alkali and flour extender having an affinity for such partially condensed phenol-aldehyde resin selected from the group consisting of bark and peanut shells at a temperature above 150° F., mixing the partially condensed phenol-aldehyde resin with the aqueous preparation of alkali and flour extender, and heating such mixture including flour extender, phenol and aldehyde to a temperature of at least 150° F. for a period of at least 10 minutes to effect further condensation.

4. The method of making adhesive which comprises heating and thereby partially condensing phenol and aldehyde in the proportion of 1.85 to 2.2 moles of aldehyde to one mole of phenol in the presence of alkali, heating an aqueous mixture of alkali and flour extender having an affinity for such partially condensed phenol-aldehyde resin selected from the group consisting of bark and peanut shells at a temperature above 150° F., mixing the partially condensed phenol-aldehyde resin with the aqueous preparation of alkali and flour extender, and heating such mixture including flour extender, alkali and phenol-aldehyde resin to a temperature of 175° F. to 185° F. for a period of at least 10 minutes to effect further condensation.

5. The adhesive obtained by the method defined in claim 1.

6. The adhesive obtained by the method defined in claim 2.

7. The adhesive obtained by the method defined in claim 3.

8. The adhesive obtained by the method defined in claim 4.

References Cited by the Examiner

UNITED STATES PATENTS

| | | | |
|---|---|---|---|
| Re. 19,710 | 9/1935 | Pollak | 260—57 |
| 2,478,943 | 8/1949 | Rhodes | 260—17.2 |
| 2,574,784 | 11/1951 | Heritage | 260—17.2 |
| 3,008,907 | 11/1961 | Williams | 260—7 |
| 3,053,784 | 9/1962 | Herrick et al. | 260—17.2 |

WILLIAM H. SHORT, *Primary Examiner.*

ALFONSO D. SULLIVAN, JAMES A. SEIDLECK,
*Examiners.*

J. ZIEGLER, J. NORRIS, *Assistant Examiners.*